(12) United States Patent
Formanek et al.

(10) Patent No.: US 7,416,321 B2
(45) Date of Patent: Aug. 26, 2008

(54) LIGHTING APPARATUS FOR MOTOR VEHICLES

(75) Inventors: Jan Formanek, Mehlenice (CZ);
Thomas Hilsenbeck, Erwitte (DE); Jiri Cernoch, Olomouc-Chomoutor (CZ);
Karsten Dieckmann, Geseke (DE);
Frank Merkelbach, Geseke (DE);
Horst Wicker, Lippstadt (DE)

(73) Assignees: Hella KGAA Hueck & Co., Lippstadt (DE); Hella Autotechnik S.R.O., Mohelnice (CZ)

(*) Notice: Subject to any disclaimer, the term of this patent is extended or adjusted under 35 U.S.C. 154(b) by 0 days.

(21) Appl. No.: 11/227,117

(22) Filed: Sep. 16, 2005

(65) Prior Publication Data

US 2006/0062005 A1    Mar. 23, 2006

(30) Foreign Application Priority Data

Sep. 17, 2004    (DE)    ............. 10 2004 045 589

(51) Int. Cl.
*B60Q 1/04*    (2006.01)
(52) U.S. Cl. ................................. 362/507; 362/538
(58) Field of Classification Search ............... 362/507,
362/470, 473, 478, 485, 487, 508, 538, 539,
362/543–546, 549, 227, 240–245, 327, 328
See application file for complete search history.

(56) References Cited

U.S. PATENT DOCUMENTS

| | | | | |
|---|---|---|---|---|
| 4,895,693 A | * | 1/1990 | Suzuki et al. ............... | 362/544 |
| 5,172,972 A | * | 12/1992 | Terao ........................ | 362/517 |
| 5,546,284 A | * | 8/1996 | Harada ...................... | 362/487 |
| 5,558,423 A | | 9/1996 | Schatka et al. | |
| 5,702,173 A | * | 12/1997 | Kawamura .................. | 362/505 |
| 5,833,345 A | * | 11/1998 | Ito ............................ | 362/507 |
| 6,076,945 A | * | 6/2000 | Matsubara et al. .......... | 362/346 |
| 6,511,215 B2 | * | 1/2003 | Hashigaya .................. | 362/515 |
| 2001/0040811 A1 | | 11/2001 | Chase et al. | |

FOREIGN PATENT DOCUMENTS

| | | |
|---|---|---|
| DE | 1 101 984 | 3/1961 |
| DE | 19 58 761 | 5/1971 |
| DE | 44 45 187 A1 | 6/1996 |
| DE | 91 17 246 U1 | 4/1998 |
| DE | 199 41 524 A1 | 3/2001 |
| EA | 4133527 A1 | 4/1993 |
| EP | 1291240 A2 | 3/2003 |
| GB | 1 283 856 | 8/1972 |

* cited by examiner

*Primary Examiner*—Hargobind S Sawhney
(74) *Attorney, Agent, or Firm*—Birch, Stewart, Kolasch & Birch, LLP

(57) ABSTRACT

A lighting apparatus for motor vehicles is provided that includes a plurality of chambers having at least one light source each and being formed by one light unit each, and a baffle frame with a plurality of openings each being dedicated to the light units, whereby the lighting apparatus is formed of segments comprising a plurality of light modules, which are mounted to an area of a rear side of the baffle frame, at least one cover pane, which is mounted to a front side of the baffle frame, whereby the rear side of the baffle frame is formed such that it conforms to connect to a front housing rim of the light module.

12 Claims, 2 Drawing Sheets

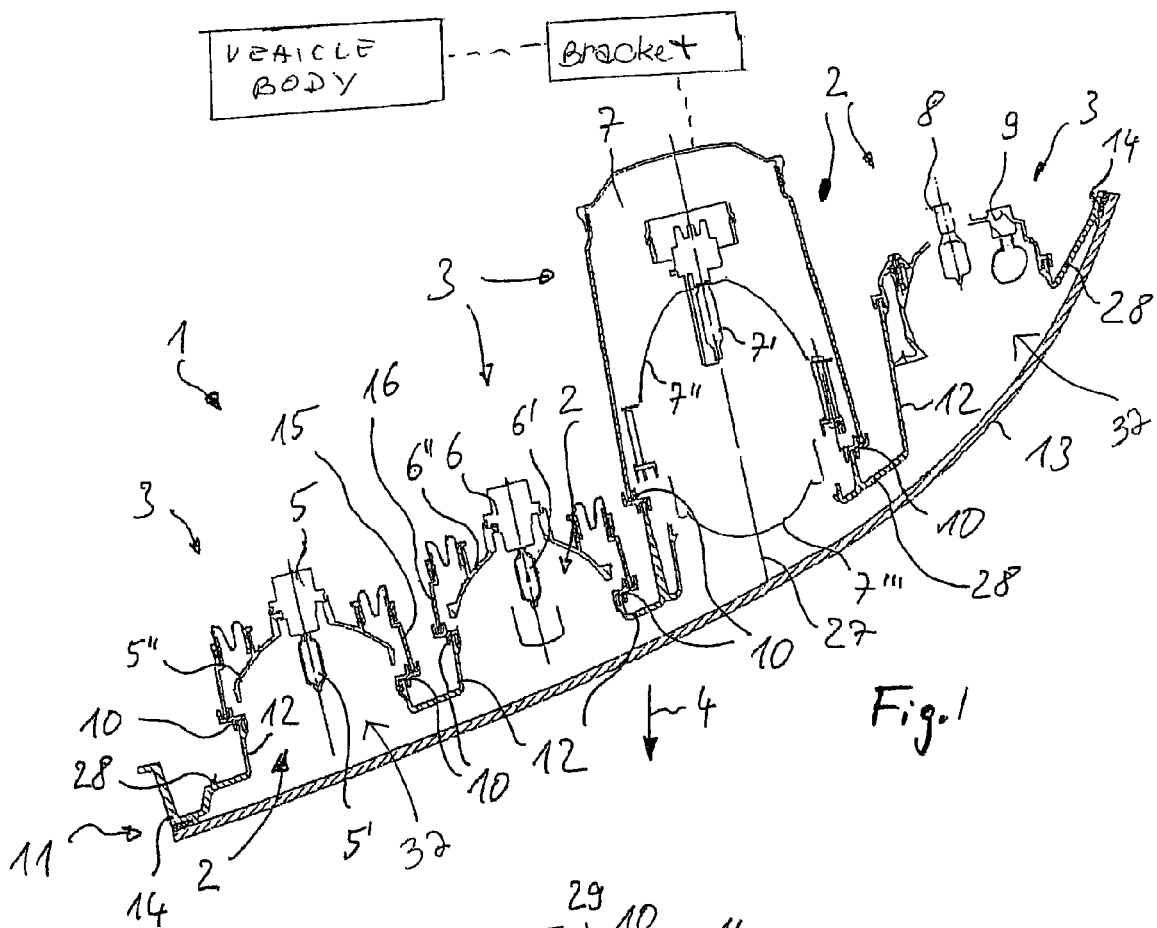
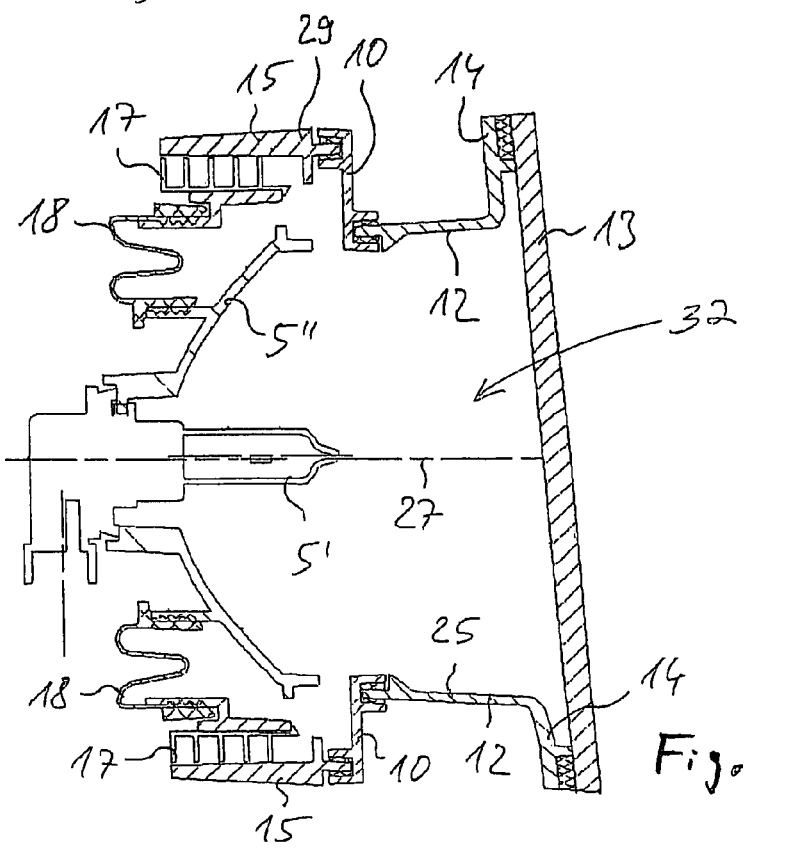
Fig. 1
Fig. 2

LIGHTING APPARATUS FOR MOTOR VEHICLES

This nonprovisional application claims priority under 35 U.S.C. § 119(a) on German Patent Application No. DE 102004045589, which was filed in Germany on Sep. 17, 2004, and which is herein incorporated by reference.

BACKGROUND OF THE INVENTION

1. Field of the Invention

The present invention relates to a lighting apparatus for motor vehicles comprised of a plurality of chambers having at least one light source each and being formed by one light unit each, and having a baffle frame with a plurality of openings, each of which being designated to the light units.

2. Description of the Background Art

From DE 44 45 187 A1, a lighting apparatus for motor vehicles is known, wherein an opaque-baffle frame, together with a shield closing the lighting apparatus, is held in a seating bed of a housing by an adhesive. On a rear side of the opaque-baffle frame, a light-transmissive screen is form-fittingly connected. Due to the dual fastening of the opaque-baffle frame to the shield and the housing, a variation with respect to the positioning of light units in a lighting apparatus with a plurality of light chambers is not possible.

DE 91 17 246 U1 discloses a lighting apparatus for motor vehicles with a plurality of chambers, each forming a light unit, whereby on the one hand, a baffle frame is connected to a cover pane that covers the lighting apparatus, and on the other hand, the baffle frame is connected to reflectors, which are dedicated to the respective light units, and to the light-transmissive screens. Due to the direct coupling of the baffle frame to a front reflector edge of the respective light units, variation options with regard to the positioning of light units are limited.

From DE 199 41 524 A1, a lighting apparatus for motor vehicles is known that includes a baffle frame having a plurality of openings, in which chamber-forming light units are individually mounted. Each light unit is comprised of a housing and a light pane, which covers a front housing opening, whereby a reflector and a light source dedicated thereto are arranged inside the pot-shaped housing. The housing is inserted in the opening of the baffle frame and is detachably connected thereto by a screw connection. The conventional lighting apparatus allows easy replacement of the baffle frame's light units, which are dedicated to the respective openings. Furthermore, it is possible to position the light units in several or different openings of the baffle frame. This, however, requires that the transverse extensions of the light units correspond with the respective dimensions of the openings of the baffle frame.

SUMMARY OF THE INVENTION

It is therefore an object of the present invention to provide a lighting apparatus for motor vehicles such that with little expenditure, an improved variation of the distribution of light chambers is assured.

To meet this objective the lighting apparatus is made of segments and includes a plurality of light modules, which are mounted in the area of a rear side of the baffle frame, at least one cover pane, which is attached to a front side of the baffle frame, whereby the rear side of the baffle frame is formed such that it conforms to a front housing rim of the light module.

The segmented structure of the light modules of the present invention on the one hand, and baffle frame and/or cover pane on the other hand make it possible that only one segment, that is, the baffle frame, needs to conform in its outer dimensions to the remaining segments, that is, the light modules. Beneficially, the light modules can be provided as standard modules, whereby the customized adjustment to space specification in the motor vehicle can be done by altering the baffle frame or the cover pane. Thus, the manufacturing costs for the variation and combination of different light modules in a mutual lighting apparatus can be substantially reduced.

In an embodiment of the invention, the baffle frame, together with the cover pane, forms a terminating module, which is connected with a plurality of light modules. Essentially, the terminating module determines the exterior appearance of the lighting apparatus. In particular, the light modules determine the light functions. Thus, a functional and structural linkage of different modules in a light-exit direction is achieved.

According to a further embodiment of the invention, the terminating module is coupled with a plurality of light modules by an adaptor. The adaptor, or a plurality thereof, allow an optimal conformity between the terminating module and the light modules. In a simple manner, a preset distribution of the light chambers can be realized with standard light modules. If need be, pre-fabricated terminating modules can be adapted to pre-fabricated light modules, whereby the independence in regard to the structural design of the terminating module on the one hand and the light modules on the other hand is further increased.

In a further embodiment of the invention, the adaptor essentially extends transversely to an optical axis of the corresponding light module. It is preferable that the adaptor connects to the rear side of the baffle frame in a radial outward direction. This prevents the housing of the respective light module from being visible from the outside so that the respective light units, which are comprised of light modules and terminating modules, give a uniform optical impression that satisfies consumer-specific design requirements. Furthermore, the fabrication of the housing of the light units is simplified since no sliding split mold is required.

According to a further embodiment of the invention, the baffle frame and the cover pane, the baffle frame and the adaptor as well as the adaptor and a front housing rim of the light module, respectively, are attached to one another by adhesion. The structural combination of the light modules, the terminating module, and the adaptor can be done in a simple manner by a single adhesion method.

In a further embodiment of the invention, the light module is provided with a pivotable reflector so that terminating modules of different designs can be used with standard light modules with pivotable reflectors.

According to a further embodiment of the invention, a light module can also be directly connected with the terminating module, whereby the reflector is preferably comprised of a first and a second reflector segment. A first reflector segment is dedicated to a first light source of the light module in order to form a first light function. The second reflector segment is dedicated to a second light source of the same light module in order to form a second light function. Thus, two light functions can be integrated inside a light module in a space-saving manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 illustrates a horizontal cross-section of a lighting apparatus;

FIG. 2 illustrates a vertical cross-section of a first light unit of the lighting apparatus;

DETAILED DESCRIPTION

Figure 3:
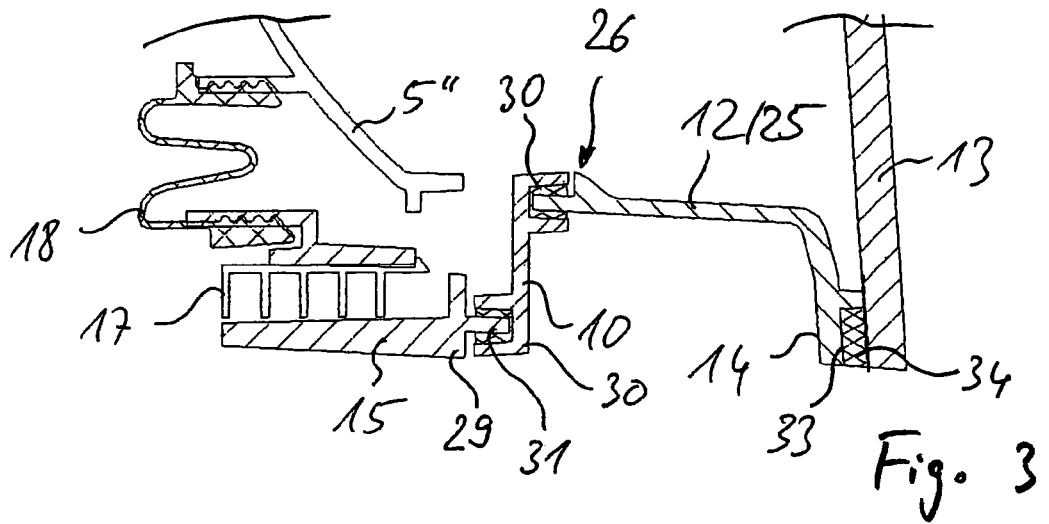
FIG. 3 shows an enlarged vertical cross-section of a lower area of the first light unit of FIG. 2.

A lighting apparatus 1 for motor vehicles, particularly commercial vehicles, in accordance with the present invention preferable serves as a headlight, in which several light functions are integrated.

The lighting apparatus 1, which is illustrated in FIG. 1, has four chambers 2, to each of which essentially one light unit 3 is dedicated. The light units 3 are made of segments, whereby in a light-exit direction 4, light modules 5, 6, 7, 8, 9, each being dedicated to different light functions, are arranged in a first plane, an adaptor 10 in a second plane, and a terminating module 11 in a third plane, which is located in front of the terminating module 11.

The terminating module 11 is formed by a baffle frame 12 and a cover pane 13, which covers the entire lighting apparatus 1, and which is connected to a front rim 14 of the baffle frame 12 by adhesion. The baffle frame 12 and the cover pane 13 form a prefabricated component, which in a further processing step is connected to the light modules 5, 6, 7, 8, 9 via the adaptor 10 by adhesion.

One purpose of the baffle frame 12 is to serve as a support frame for the light modules 5, 6, 7, 8, 9 as well as for the cover pane 13. For this purpose, the baffle frame 12 is provided with fastening clips (not shown), through which it is friction-locked (by screw connection) to a body part of the vehicle. In addition, the light module 7 can be provided, both on the top or the bottom, with brackets (not illustrated) for a friction-locked connection to the body part of the vehicle.

The light modules 5, 6, 7, 8, 9 are comprised of light-generating or light-transmitters. A first light module 5, for example, has a light source 5' and a reflector 5" to generate an additional high-beam function. A second light module 6 has a light source 6' and a reflector 6" to generate a fog-light function. The light modules 5, 6 include a housing 15 and 16, respectively, in which the light sources 5', 6', that is, the reflectors 5" or 6", are located. As can be more easily seen in FIG. 2, adjacent thereto, on an interior wall of the housing 15, is a venting spout 17 to allow the ventilation of the reflector 5" as well as the entire lighting apparatus 1, and furthermore, in a radial inward direction, a rubber cap 18 for sealing is provided.

A third light module 7 is formed as a projection module having a light source 7', a reflector 7", a baffle (not shown) as well as a lens 7'". The purpose of the third light module 7 is to generate a low-beam light function.

By utilizing servo units (not shown) for the basic setting, the reflectors 5", 6", 7" of the light modules 5, 6, 7 can be pivotable.

Figure 4:
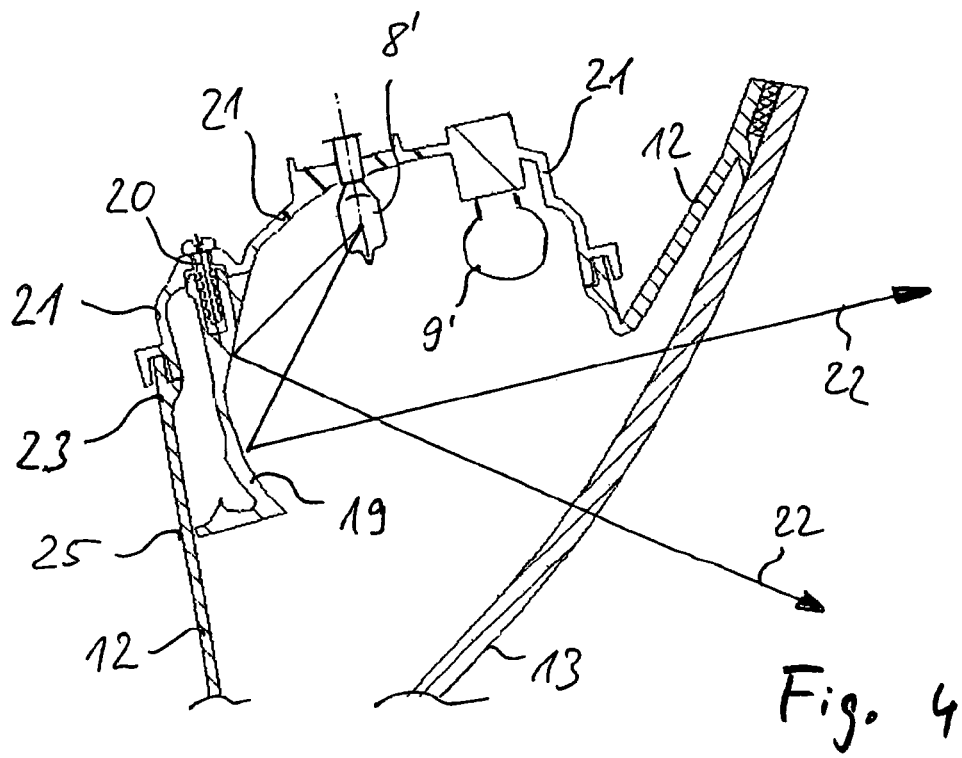
FIG. 4 shows an enlarged horizontal cross-section of a second light unit of the lighting apparatus.

In a fourth and last chamber, a fourth light module 8 and a fifth light module 9 are integratably arranged. As is better discernable in FIG. 4, a reflector is formed by a first reflector segment 19, facing the center of the vehicle, and by a second reflector segment 21, which is connected to the first reflector element 19 by a screw connection 20. The second reflector segment 21 has an opening for a first light source 8', which interacts with the first reflector segment 19 to generate a static adaptive light function. The instant an adaptive light application is detected, the light source 8' is activated to provide an improved illumination of the course of the road. Essentially, the light beams 22 that are generated by the first light source 8' are emitted laterally away from the center of the vehicle and exoterically through the cover pane 13.

The second reflector segment 21 includes, in addition, a further opening to seat a second light source 9', which, together with the second reflector segment 21, generates a position light function. If need be, the first reflector segment 19 can also be utilized to generate the position light function. The reflector segments 19, 21 of the light modules 8, 9 are directly connected to a rear side 23 of one of the tubular wall segments 25 of the baffle frame 12 that is dedicated to the light modules 8, 9.

The baffle frame 12 is essentially comprised of the tubular wall sections 25 that are dedicated to the light modules 5, 6, 7, 8, 9, which are basically oriented coaxially to the optical axes 27 of the light modules 5, 6, 7, 8, and which are connected on the rear side 26 of the baffle frame 12 to the adaptor 10 by adhesion. Furthermore, the baffle frame 12 essentially includes the second wall segments 28, which generate the baffle function, and which basically extend in a plane and parallel to the cover pane 13. Alternatively, the extension is non-parallel. The second wall segments 28 connect the tubular wall segments 25.

The adaptor 10 has a groove 30 on both ends to form an adhesion bed, in which a bar 31 of the front housing edge 29 as well as the baffle frame 12 is held in place by adhesion. This particularly allows the adjustment of openings 32 of the baffle frame 12 that are of identical size to light modules 5, 6, 7 of varying transversal extension. In this way, a preset baffle geometry can be combined with preset dimensions of light modules 5, 6, 7. Alternatively, the adaptor 10 can also have bars on each of the two free ends, which engage with a groove in the front housing edge 29 as well as in the baffle frame 12, and which are held in place with an adhesion bed by adhesion.

The cover pane 13 is connected at a front side 33 of the baffle frame 12 by adhesion 34. Preferably, the cover pane 13 is made of transparent material. The baffle frame 12 can have a reflective metal coating, for example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting apparatus for motor vehicles, the lighting apparatus comprising:
  a plurality of chambers having at least one light source each and being formed by one light unit each;
  a baffle frame having a plurality of openings, each being dedicated to a respective light unit;
  at least one cover pane, which is mounted to a front side of the baffle frame;

a plurality of light modules having front housing rims that are mounted to an area of a rear side of the baffle frame; and at least one adaptor for adjusting the size of the baffle frame openings, wherein a rear side of the baffle frame is adapted to connect to the front housing rim of each light module, and wherein the at least one adaptor has two free ends with bars thereon.

2. The lighting apparatus according to claim 1, further comprising a terminating module, wherein at the terminating module, the baffle frame is connected with the cover pane.

3. The lighting apparatus according to claim 1, wherein the at least one adaptor extends substantially transversely to an optical axis of light emitted by the lighting apparatus.

4. The lighting apparatus according to claim 1, wherein the baffle frame and the cover pane, as well as the baffle frame and the at least one adaptor, as well as the adaptor and the front housing wall of the at least one of the light modules are respectively attached to one another by adhesion.

5. The lighting apparatus according to claim 1, wherein at least one of the light modules has a pivotable reflector.

6. The lighting apparatus according to claim 1, further comprising at least one bracket connecting the baffle frame to a vehicle body.

7. The lighting apparatus of claim 1, further comprising a plurality of adaptors to connect the baffle frame and/or the terminating module to light modules, wherein at least one of the plurality of adaptors has two free ends with bars thereon which are adapted to engage with a groove in the front housing rim as well as with a groove in the baffle frame.

8. The lighting apparatus according to claim 1, wherein at least one adaptor is distinct from the baffle frame and a light module for adjustably connecting the substantially same fixed size baffle frame openings and at least one of the variably sized light modules.

9. A lighting apparatus for motor vehicles, the lighting apparatus comprising:

a plurality of chambers having at least one light source each and being formed by one light unit each;

a baffle frame having a plurality of openings, each opening being dedicated to a respective light unit;

at least one cover pane, which is mounted to a front side of the baffle frame; and a plurality of light modules which are mounted to an area of a rear side of the baffle frame; and at least one adaptor for adjusting the size of the baffle frame openings, wherein a rear side of the baffle frame is formed such that it conforms to connect to a front housing rim of each light module, and wherein the baffle frame is provided with tubular wall segments, which connect to a front reflector rim of respective corresponding reflector of the light module, spaced in a light-exit direction, and wherein the at least one adaptor has two free ends with bars thereon.

10. A lighting apparatus for motor vehicles, the lighting apparatus comprising:

a plurality of chambers having at least one light source each and being formed by one light unit each;

a baffle frame having a plurality of openings, each being dedicated to a respective light unit;

at least one cover pane, which is mounted to a front side of the baffle frame; and a plurality of light modules which are mounted to an area of a rear side of the baffle frame, wherein the rear side of the baffle frame is formed such that it conforms to connect to a front housing rim of each light module, and wherein one of the light modules is directly connected with the baffle frame, wherein a reflector of the light module includes a first reflector segment, which is dedicated to a first light source of the light module, for generating a first light function, and of a second reflector segment, which is dedicated to a second light source of the light module, for generating a second light function.

11. The lighting apparatus according to claim 10, wherein, in order to generate an adaptive light function, the first reflector segment is arranged on a side of the light module that faces the center of the vehicle.

12. The lighting apparatus according to claim 10, further comprising a screw connection adapted to connect the first reflector segment with the second reflector segment.

* * * * *